United States Patent
Haggenmüller et al.

(10) Patent No.: US 11,581,789 B2
(45) Date of Patent: Feb. 14, 2023

(54) METHOD AND DEVICE FOR WINDING A WAVE WINDING MAT AND WAVE WINDING MAT THAT CAN BE PRODUCED BY MEANS OF THE SAME

(71) Applicant: GROB-WERKE GmbH & Co. KG, Mindelheim (DE)

(72) Inventors: Tobias Haggenmüller, Unterthingau (DE); Günter Dreier, Deisenhausen (DE)

(73) Assignee: GROB-WERKE GmbH & Co. KG, Mindelheim (DE)

( * ) Notice: Subject to any disclaimer, the term of this patent is extended or adjusted under 35 U.S.C. 154(b) by 155 days.

(21) Appl. No.: 16/634,001

(22) PCT Filed: Jul. 27, 2018

(86) PCT No.: PCT/DE2018/100670
§ 371 (c)(1),
(2) Date: Jan. 24, 2020

(87) PCT Pub. No.: WO2019/020148
PCT Pub. Date: Jan. 31, 2019

(65) Prior Publication Data
US 2020/0395831 A1 Dec. 17, 2020

(30) Foreign Application Priority Data

Jul. 28, 2017 (DE) .......................... 102017117191.6
Sep. 6, 2017 (DE) .......................... 102017120559.4

(51) Int. Cl.
*H02K 15/04* (2006.01)
*H02K 3/04* (2006.01)

(52) U.S. Cl.
CPC ........... *H02K 15/0478* (2013.01); *H02K 3/04* (2013.01)

(58) Field of Classification Search
CPC ..................... H02K 15/0478; H02K 3/04
See application file for complete search history.

(56) References Cited

U.S. PATENT DOCUMENTS 3,699,371 A * 10/1972 Henry-Baudot ......... H02K 3/04
                                                                    310/268
5,289,129 A *  2/1994 Joseph ................. G01R 33/385
                                                                    324/318
(Continued)

FOREIGN PATENT DOCUMENTS

DE        10328956 A1    1/2005
DE    102004042768 A1    3/2006
(Continued)

OTHER PUBLICATIONS

International Search Report; priority document.
German Search Report; priority document.

*Primary Examiner* — Peter Dungba Vo
*Assistant Examiner* — Jose K Abraham
(74) *Attorney, Agent, or Firm* — Greer, Burns & Crain, Ltd.

(57) ABSTRACT

In order to facilitate the production of coil windings in components of electrical machines a method and a device are provided for winding a wave winding mat for forming a coil winding of an electrical machine, wherein one or more wires are wound with a predefined wire spacing between wire sections, wherein the wire spacing is set differently for different regions of the wave winding mat.

7 Claims, 7 Drawing Sheets

(56) References Cited

U.S. PATENT DOCUMENTS

| | | | |
|---|---|---|---|
| 6,477,762 B1* | 11/2002 | Sadiku | H02K 15/0478 |
| | | | 29/596 |
| 7,281,312 B2 | 10/2007 | Sadiku et al. | |
| 8,487,729 B2* | 7/2013 | Bulatowicz | G01R 33/381 |
| | | | 335/220 |
| 8,667,666 B2 | 3/2014 | Sadiku et al. | |
| 8,674,692 B2* | 3/2014 | Camp | G01R 33/341 |
| | | | 324/309 |
| 10,110,078 B2 | 10/2018 | Neet | |
| 2004/0261885 A1* | 12/2004 | Sadiku | H02K 15/06 |
| | | | 140/92.1 |
| 2005/0151438 A1* | 7/2005 | Huang | H02K 17/12 |
| | | | 310/180 |
| 2006/0022547 A1 | 2/2006 | Sadiku et al. | |
| 2006/0230603 A1* | 10/2006 | Hirota | H02K 15/0478 |
| | | | 29/605 |
| 2008/0211322 A1 | 9/2008 | Heinrich et al. | |
| 2010/0259124 A1* | 10/2010 | Bodin | H02K 15/0478 |
| | | | 310/208 |
| 2015/0054374 A1* | 2/2015 | Neet | H02K 3/12 |
| | | | 310/198 |
| 2018/0294700 A1* | 10/2018 | Ponzio | H02K 15/0478 |
| 2018/0294701 A1 | 10/2018 | Lüttge | |
| 2018/0331606 A1 | 11/2018 | Sadiku et al. | |
| 2018/0367015 A1 | 12/2018 | Sadiku et al. | |
| 2019/0214892 A1* | 7/2019 | Lüttge | B21F 3/00 |
| 2019/0238019 A1 | 8/2019 | Sadiku et al. | |
| 2020/0280231 A1* | 9/2020 | Koga | H02K 15/064 |

FOREIGN PATENT DOCUMENTS

| | | | | |
|---|---|---|---|---|
| DE | 102008019479 A1 | | 10/2009 | |
| DE | 102014111803 A1 | | 2/2015 | |
| DE | 102015120661 A1 | | 6/2017 | |
| DE | 102015120963 A1 | | 6/2017 | |
| DE | 102016118871 A1 | | 4/2018 | |
| DE | 102016222818 A1 | * | 5/2018 | H02K 3/28 |
| DE | 102016222818 A1 | | 5/2018 | |
| EP | 3182568 A1 | | 6/2017 | |
| JP | 2003324911 A | | 11/2003 | |
| JP | 2015126629 A | * | 7/2015 | |
| JP | 2021058076 A | * | 4/2021 | |
| WO | 2016174542 A1 | | 11/2016 | |
| WO | 2018091163 A1 | | 5/2018 | |

\* cited by examiner

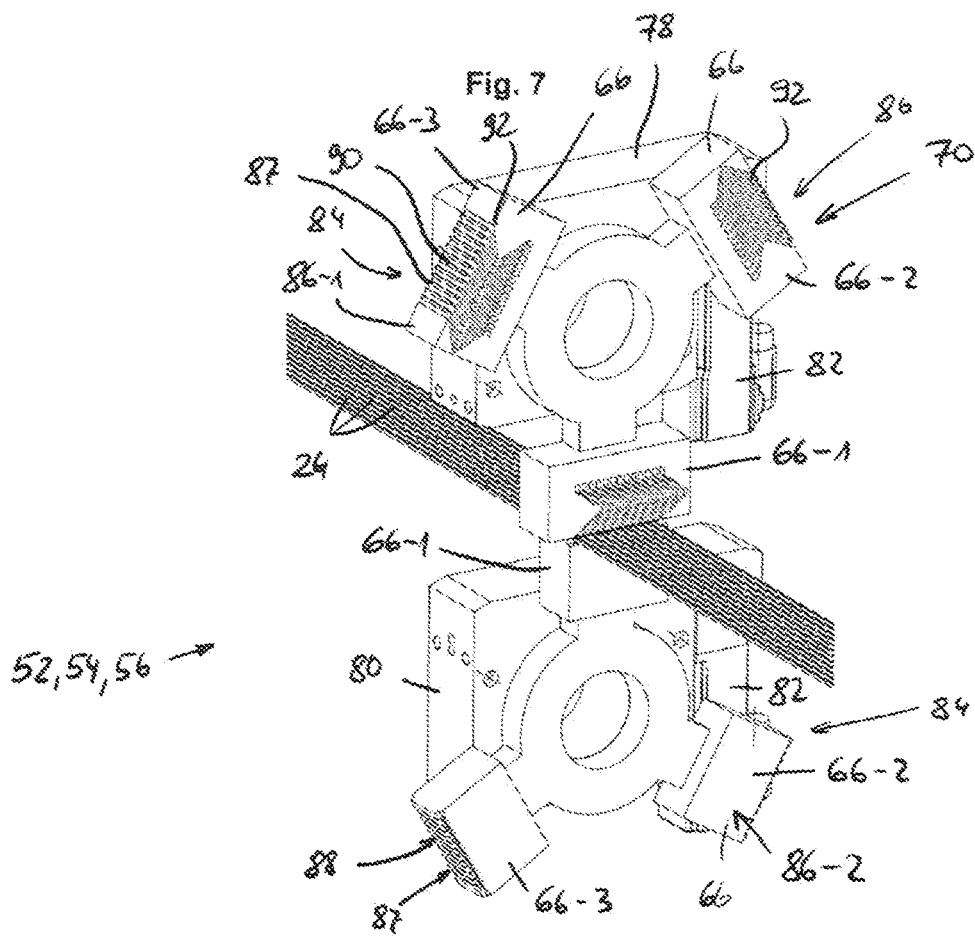
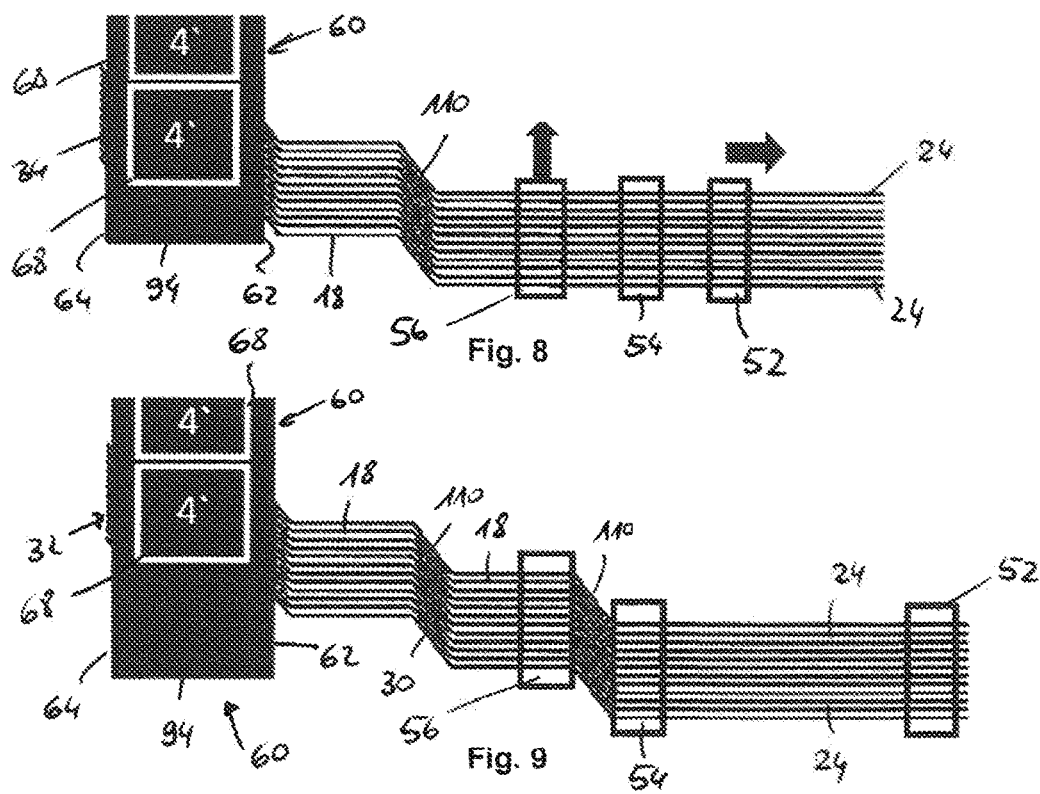

METHOD AND DEVICE FOR WINDING A WAVE WINDING MAT AND WAVE WINDING MAT THAT CAN BE PRODUCED BY MEANS OF THE SAME

CROSS-REFERENCES TO RELATED APPLICATIONS

This application claims the benefit of the International Application No. PCT/DE2018/100670, filed on Jul. 27, 2018, and of the German patent application No. 102017120559.4 filed on Sep. 6, 2017, and of the German patent application No. 102017117191.6 filed on Jul. 28, 2017, the entire disclosures of which are incorporated herein by way of reference.

FIELD OF THE INVENTION

The invention relates to a wave winding method for winding a wave winding mat for forming a coil winding of an electrical machine. The invention further relates to a wave winding mat for forming a coil winding of an electrical machine. Finally, the invention relates to a wave winding device for winding a wave winding mat for forming a coil winding of an electrical machine.

BACKGROUND OF THE INVENTION

With respect to the technological background of the invention, reference is made to the following sources:
[1] WO 2016/174542 A1
[2] DE 10 2015 120 661 A1
[3] DE 10 2015 120 963 A1
[4] EP 3 182 568 A1

The present invention is in the field of the production of electric motors or other electrical machines, such as generators, for example, which are designed for high performance, reliable operation and high efficiency. In particular, electric motors are to be produced that can be used as driving engines of electric vehicles or hybrid vehicles and have a nominal output of between 20 kW and 400 kW, for example. In order to build stators of such high-performance electrical machines, it is advantageous to provide as high a coil density as possible.

In this regard, it is known from the aforementioned sources [1] to [4] to provide wave winding mats that can be fitted into radially open grooves of a holding body, such as, in particular, the main body of a stator or rotor. In order to achieve a particularly high filling level, the coil windings are made from, in particular, wires with a rectangular cross section, for which winding methods devised for winding wires with a round cross section are not very suitable. According to the sources [1] to [4], wave winding mats for providing the coil windings are therefore proposed which include, for example, a plurality of parallel wires that have straight wire sections which are disposed in the grooves of a stator. These straight sections alternate between an inner radial position and an outer radial position in the component of the electrical machine, with bent-back portions that are referred to as end turns being provided between these straight wire sections, at the longitudinal edges of the wave winding mat.

For winding the wave winding mat, the sources [2] to [4] suggest winding a bundle of parallel wires onto a winding blade rotatable about an axis of rotation. Prior to winding, the bundle of parallel wires is bent in some portions to form slanting wire sections that extend between the straight wire sections and form the end turns after the bend-back process on the winding blade.

[1] describes winding a wave winding mat with a winding apparatus that has no winding blade. Generally, a bend-back process takes place on a bending edge provided on a bend-back member rotatable about an axis of rotation.

A wave winding mat is produced in this manner, which extends, with straight wire sections in two layers and end turns between them, over such a length that it can be inserted in several layers into a stator. The grooves of the stator are only slightly larger than the wires to be inserted therein, so that the insertion of the wires is difficult to handle.

SUMMARY OF THE INVENTION

The invention has set itself an object of providing a wave winding mat and a method and a device for producing the same, by means of which the production process of an electrical machine can be simplified.

The invention, according to a first aspect, provides a wave winding method for winding a wave winding mat for forming a coil winding of an electrical machine, characterized by winding one or several wires with a predefined wire spacing between wire sections, wherein the wire spacing is set differently for different regions of the wave winding mat.

Different wire spacings may be formed in different ways. Particularly when several wires are processed parallel to each other, it is advantageous if the wires are held on jaws that are preferably configured for holding the wires in a predefined spacing.

Preferably, at least one first jaw on a holding device for holding wires that are guided substantially parallel to each other is exchanged for forming different wire spacings.

Preferably, at least one second jaw on a rotatable winding apparatus is exchanged for forming different wire spacings.

Preferably, an offset between two wire sections connected to each other by an inclined wire section is changed for forming different wire spacings.

Preferably, end turns, which are preferably formed with wire sections bent back in a U-shape, are formed differently in different regions of the winding wave mat.

According to an alternative, the invention provides a wave winding method for winding a wave winding mat for forming a coil winding of an electrical machine, characterized by winding one or several wires with a predefined wire spacing between wire sections, wherein end turns are formed differently in different regions of the wave winding mat.

Preferably, the wave winding method comprises the step:

Transporting, by means of several jaws, an already wound region of the wave winding mat to be produced, by moving the jaws on a jaw guide extending in the direction of an axis of rotation of a winding apparatus.

Preferably, the wave winding method comprises the step:

Returning jaws from the end of the jaw guide to its beginning.

According to another aspect, the invention provides a wave winding mat for forming a coil winding of an electrical machine, wherein substantially straight wire sections are disposed at a predefined wire spacing from each other, wherein the wave winding mat has regions in which the predefined wire spacing is different.

Preferably, the wave winding mat can be produced by means of a wave winding method according to any one of the preceding embodiments and/or by means of a wave winding device according to any one of the embodiments explained below.

Preferably, a first region with a first wire spacing d1 extends from one end of the wave winding mat in the direction of the longitudinal extent of the wave winding mat, a third region with a third wire spacing d3 extends in the direction of the longitudinal extent of the wave winding mat up to the other end, a second region with a second wire spacing d2 is provided between the first region and the third region, and: d1>d2>d3.

Preferably, end turns, which are preferably formed with wire sections bent back in a U-shape, are formed differently in the different regions of the winding wave mat.

According to an alternative of the further aspect, the invention provides a wave winding mat for forming a coil winding of an electrical machine, wherein substantially straight wire sections are disposed at a predefined wire spacing from each other, wherein the wave winding mat has regions in which the shape of end turns is different.

Preferably, the end turns, in a first region extending from one end of the winding wave mat in the longitudinal direction of the winding wave mat, are formed more towards one side in a first direction transverse to the longitudinal direction, and, in a third region extending from the other end of the winding wave mat in the longitudinal direction, the end turns are formed more towards the other side in the second direction, which is opposite to the first direction, transverse to the longitudinal direction.

Thus, for example in an outer layer, which is formed by the first region, of the wave winding mat used as a coil winding in operation, the end turns can extend radially outwards to a greater degree, and, in an inner layer formed by the third region, the end turns can extend inwards to a greater degree. The mounting of the wave winding mat is thus made even easier.

All of the above-mentioned properties and features are obtained, in a wave winding mat according to an embodiment of the invention, prior to its mounting in a component of the electrical machine, i.e., in the non-deformed, load-free state.

According to another aspect, the invention provides a wave winding device for winding a wave winding mat for forming a coil winding of an electrical machine, comprising:

at least one holding device for holding wires that are guided substantially parallel to each other, on which a first jaw for contact with the wires is provided, a winding apparatus, which is rotatable about an axis of rotation and which has at least one bending edge, and on which is provided a second jaw for contact with the wires for the purpose of holding the wires during bending around the bending edge, and a jaw exchanging assembly for exchanging the first and/or the second jaw.

Preferably, the wave winding device is provided for carrying out the wave winding method according to any one of the preceding embodiments.

In a preferred embodiment, the winding apparatus includes a bending blade or winding blade, which is rotatable about the axis of rotation and on which the at least one bending edge, preferably a first bending edge and a second bending edge, is provided.

Instead of a bending blade or winding blade, a bending edge of almost any type may be used in order to bend back the wave winding mat around the bending edge using jaws, e.g., two second jaws, together with the bending edge. For example, the bending edge may rotate like a winding blade in the process, similar to the manner described in source [1]. In the process, the bending edge may be pulled away when a certain degree of bending has been reached, and the rest of the bend may then be produced by compression.

For the process of bending around the bending edge, it is advantageous to provide in each case at least two second jaws. Preferably, one of the second jaws is disposed upstream of the bending edge in the wire feeding direction, so that the wires do not "deviate" in a downward direction, i.e., so that support is provided against the force applied to the wires by the bending edge. Preferably, the other second jaw presses the wire against the bending edge.

Preferably, an offset for forming slanting wire sections is bent by means of the first jaws of the holding device, whereas the bend-back process is carried out by means of the second jaws of a bend-back device.

The second jaws are preferably guided on the bend-back device.

Preferably, the winding apparatus has a jaw guide for guiding several second jaws on a jaw guiding track extending with at least one directional component in the direction of the axis of rotation.

Preferably, the jaw exchanging assembly has a jaw feeding device for feeding second jaws into the jaw guide and/or a jaw returning device for returning second jaws from an end of the jaw guide to a beginning of the jaw guide.

Preferably, an end turn forming device for forming end turns of the wave winding mat while holding the latter on at least one second jaw is further provided in the region of the jaw guide.

Preferably, the end turn forming device has several regions provided with different molds or stamps for forming end turns differently in different regions of the wave winding mat.

The respective jaw exchanging unit of the jaw exchanging assembly may in each case have at least one magazine for exchanging the jaws. For example, rotary magazines or linear magazines may be used.

Preferably, the jaw exchanging assembly on the holding apparatus has a rotary magazine for exchanging first jaws. Alternatively, a linear magazine is provided. A combination of a rotary magazine and a linear magazine may also be used.

Preferably, the first and/or second jaws have wire accommodating portions for laterally positioning the wires that are guided substantially parallel to each other.

Preferably, different first and/or second jaws with different spacing between their wire accommodating portions are provided and can be exchanged by the jaw exchanging assembly.

Preferably, several holding devices are provided, of which at least one can be moved, preferably in a driven manner, relative to at least one other and/or to the winding apparatus in a direction transverse to the axis of rotation and/or in a direction parallel to the axis of rotation.

Preferably, at least one stationary holding device and at least one movable holding device are provided.

Preferably, a moving stroke of a movable holding device is adjustable.

Preferred embodiments of the invention deal with the production of a winding mat for stators and rotors of an electric motor or other electrical machine, such as a generator, for example. A preferred embodiment of the winding mat has a plurality of intertwined wires or consists of such wires.

Such winding mats serve for forming coil windings on a component of the electrical machine such as, in particular, the stator or the rotor. For this purpose, the winding mat, in a possible method for producing such a component, is wound onto a joining tool or fitted directly into the component, such as a stator. For example, grooves for accommodating wire sections are provided on the component for this purpose. Most frequently, several connected layers of the winding mat are inserted one above the other. As a consequence, the diameter of the inner layer of the winding mat is smaller than the diameter of the outer wound-up layer of the winding mat. In the case of a certain number of grooves, the groove spacing thus becomes smaller towards the inside. Thus, previously known winding mats have to be deformed when they are being mounted on the joining tool or in the stator. A preferred embodiment of the invention relates to a winding mat with different wire spacings. Furthermore, one aspect of the invention relates to the production of such a winding mat.

A preferred embodiment of the invention relates to a wire mat with different wire spacings. Among other things, such a mat is advantageous when winding it onto a joining tool or when directly inserting it into a component of an electrical machine, such as the stator of an electric motor, for example.

A preferred embodiment of the invention relates to a method and a device for winding different wire spacings. Preferably, this is made possible by using exchangeable jaws and/or circulating jaws.

Preferably, a device with circulating jaws is proposed. Preferably, circulating jaws are used for forming the winding mat.

A preferred embodiment of the winding mat serves for being wound several times around the circumference of the stator. This results in different radii for the different layers. This leads to problems during the insertion into the individual grooves. Therefore, a preferred embodiment of the mat is divided into three different portions, each of which has a different wire spacing. The mat itself has two layers, each with bent-back portions on the side, the so-called end turns. Preferably, the spacings between the wires are only very small; for example, they are in the range of a few millimeters. The differences between the wire spacings are, for example, between 0.01 mm and 0.5 mm. The number of regions with different wire spacing depends on the number of layers to be produced therewith, for example. If the winding mat is supposed to be placed on the component in only two layers, then two regions, for example, with different wire spacings would be suitable. If four layers are to be provided, four regions with different wire spacing would be advantageous.

According to another aspect, the invention relates to the use of a wave winding mat according to any one of the preceding embodiments in the production of a component of an electrical machine, particularly of a stator or rotor of an electric motor or of a generator, more particularly of a driving engine of an electric motor vehicle.

According to another aspect, the invention relates to a method for producing a component of an electrical machine, particularly of a rotor or stator of an electric motor, more particularly of a driving electric motor of an electric or hybrid vehicle, comprising: carrying out the wave winding method according to any one of the preceding embodiments, and inserting the wave winding mat into a holding body of the component in order thus to form coil windings of the component.

According to another aspect, the invention relates to a device for producing a component of an electrical machine, particularly of a rotor or stator of an electric motor, more particularly of a driving electric motor of an electric or hybrid vehicle, comprising a wave winding device according to any one of the preceding embodiments, and an inserting device for inserting the wave winding mat into a holding body of the component. Preferably, the inserting device includes an inserting tool on which the wave winding mat can be placed, e.g., wound, prior to insertion.

Other possible embodiments of the methods, devices and mats of the invention are apparent from the combination of the embodiments described herein with features or embodiments from the above-mentioned sources [1], [2], [3], and [4], to which express reference is made with respect to further details.

BRIEF DESCRIPTION OF THE DRAWINGS

Exemplary embodiments of the invention will be explained in more detail below with reference to the attached drawings. In the drawings:

FIG. 7 shows a perspective view of the holding device;

FIG. 8 shows a top view onto a region of the wave winding device of FIG. 5, wherein a first, a second and a third holding device and a part of a winding apparatus are shown in a first process step for producing the wave winding device;

FIG. 9 shows a view as in FIG. 8 in a second process step;

DETAILED DESCRIPTION OF THE PREFERRED EMBODIMENTS

Figure 1:
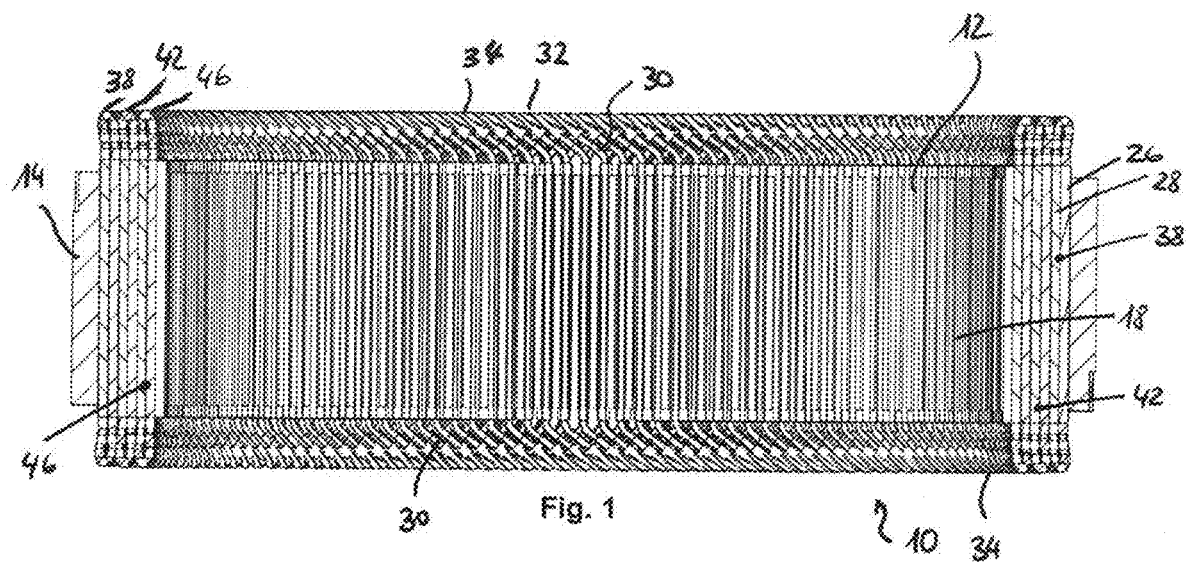
FIG. 1 shows a section through a stator along a sectional plane including a central axis of the stator, with a basic body or holding body and a coil winding, which is inserted therein and formed from a wave winding mat.
Figure 2:
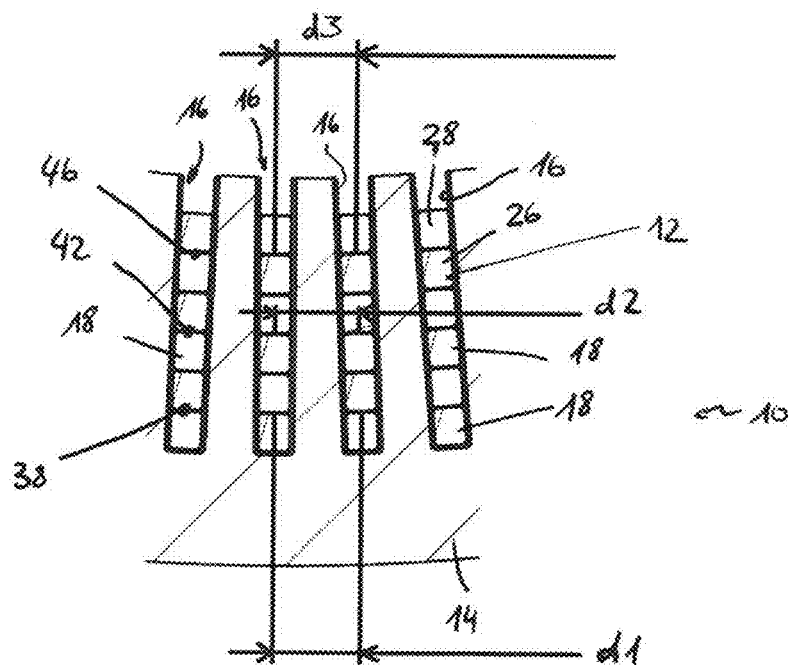
FIG. 2 shows a section along the circumference of the stator of FIG. 1 with a sectional plane extending transversely to the central axis of the stator, wherein radially open grooves and wire sections of the wave winding mat inserted therein are shown.

FIGS. 1 and 2 show a stator 10 of an electric motor that can be used as a driving engine of electric vehicles, as an example for a component of an electrical machine provided with a coil winding 12.

The stator 10 has a basic body as a holding body 14 and a coil winding 12 held thereon.

The holding body 14 has an annular configuration and has a series of radially open grooves 16, into which several layers of straight wire sections 18 of the coil winding 12 are inserted. In the exemplary embodiment shown, the grooves 16 are open towards the inside.

Figure 3:
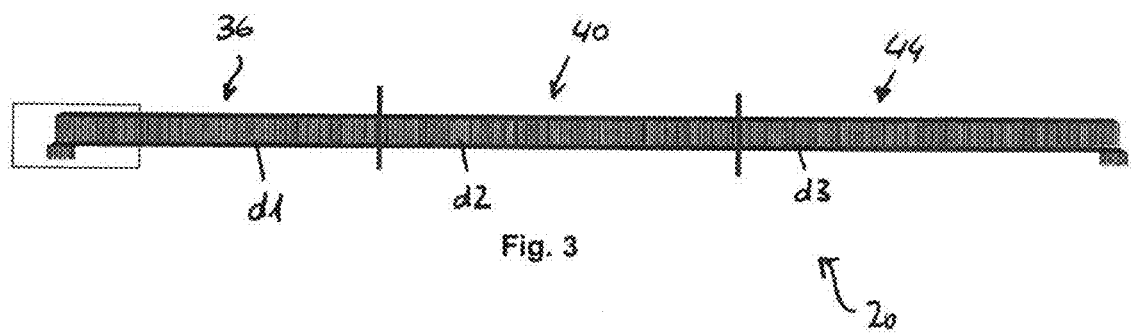
FIG. 3 shows a top view onto the wave winding mat prior to insertion into the stator according to FIGS. 1 and 2.
Figure 4:
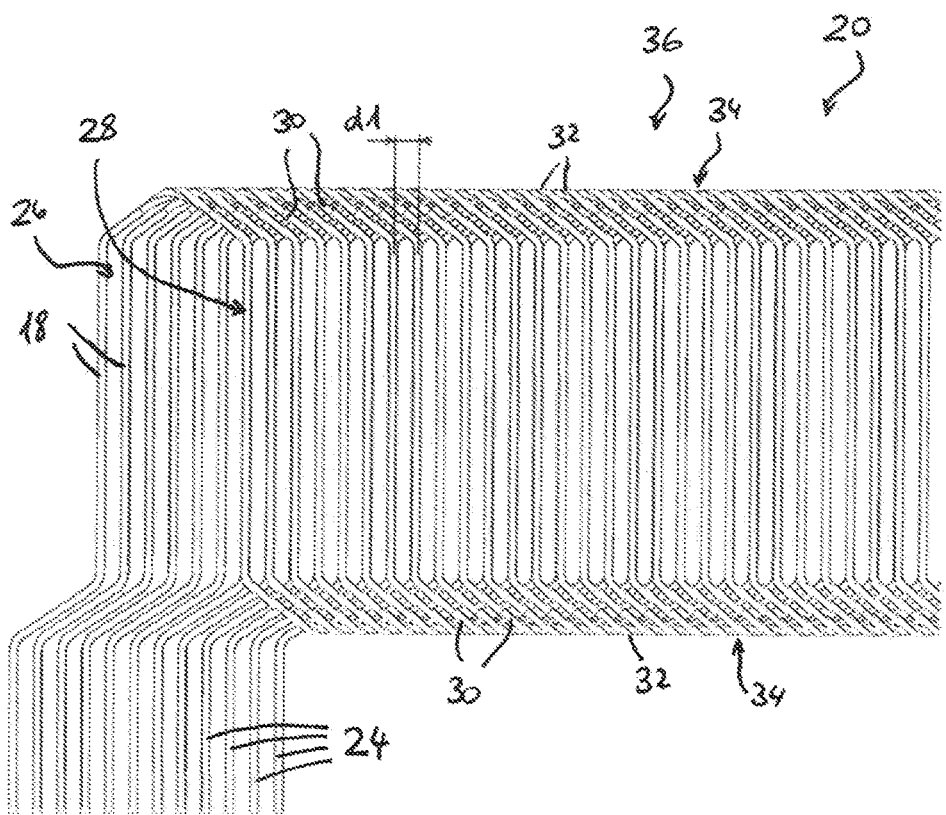
FIG. 4 shows the detail IV of FIG. 3, which shows an end of the wave winding mat.

The coil winding 12 is formed by inserting a wave winding mat 20, which is shown in more detail in FIGS. 3 and 4.

As is apparent particularly from FIG. 4, the wave winding mat 20 is formed from a bundle 24 of wires 24 guided parallel to each other, wherein the straight wire sections 18 are disposed at a predefined wire spacing d1, d2, d3. For this purpose, the wires 24 alternately extend in a first wire layer 26 and a second wire layer 28 of the wave winding mat 20, wherein end turns 34 formed by slanting wire sections 30 having a bent-back portion 32 are provided on the two longitudinal edges of the wave winding mat 20.

The wave winding mat 20 shown in FIG. 3 has a first region 36, which forms an outer layer of the coil winding 12 after insertion into the holding body 14, a second region 40, which forms a middle layer 42 of the coil winding 12 after insertion into the holding body 14, and a third region 44, which forms an inner layer 46 of the coil winding 12 after insertion into the holding body 14.

As is apparent from FIG. 2, the grooves 16, due to their radial orientation, have a greater distance from each other on the outside than on the inside. Thus, the straight wire sections 18, after insertion into the grooves 16, are spaced farther apart in the outer layer 38 than in the inner layer 46.

In order to facilitate an insertion of the wires 24 into the grooves 16 without having to deform the wave winding mat 20, the wire spacing between the straight wire sections 18 in the wave winding mat 20 shown in FIGS. 3 and 4 is selected to be different in the different regions 36, 40, 44.

Here, the wire spacing d1 in the first region 36, which in the exemplary embodiment shown here forms the outer layer 38, is greater than the wire spacing d2 in the second region 40, which forms the middle layer 42. In turn, the wire spacing d2 of the second region 40 is greater than the wire spacing d3 of the third region 44, which forms the inner layer 46. The wire spacings d1, d2, d3 are selected in accordance with the wire spacings of the coil windings 12 inserted into the grooves 16, as they are specified in FIG. 2.

Thus, FIGS. 3 and 4 show a wave winding mat 20 for forming a coil winding 12 of an electrical machine, wherein substantially straight wire sections 18 are disposed at a predefined wire spacing d1, d2, d3 from each other, wherein the wave winding mat 20 has regions 36, 40, 44 in which the predefined wire spacing d1, d2, d3 prior to insertion into a component of the electrical machine is different.

Figure 17:
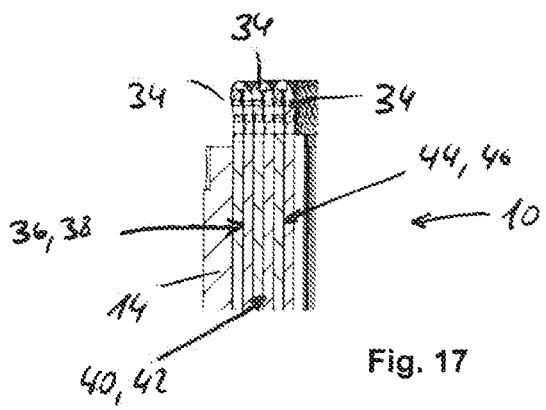
FIG. 17 shows a detail of the stator of FIG. 1 for illustrating the forming of the wave end turns by means of the end turn forming device according to FIGS. 15 and 16.

As is further apparent from FIGS. 1 and 17, the end turns 34 in the different regions 36, 40, 44 are also formed differently. In the first region 36, the end turns 34 are formed more towards the side of the wave winding mat 20, transverse to its longitudinal direction, which faces outwards when used on the stator 10. The end turns 34 in the third region 44 are directed more towards the opposite side, which is formed towards the inside in the case of a use as intended as a coil winding 12. The end turns 34 of the second region 40 have the same extent towards both sides. The shape of the wave winding mat 20 is better adapted to the future shape of the coil winding 12 also for this reason.

This, the wave winding mat 20 is easier to insert into the grooves 16, so that the production of a stator 10 is, as a whole, made easier.

The two measures of the differently defined wire spacings d1, d2, d3 and the differently shaped end turns 34 are provided together in the preferred embodiment. In other embodiments, only one of these measures is provided.

In the embodiment of the stator 10 shown, the coil winding 12 is formed by the wave winding mat 20, wound into three layers 38, 42, 46, being inserted into the grooves 16. Accordingly, three regions 36, 40, 44 with different wire spacings d1, d2, d3 are provided in the illustrated embodiment. In other embodiments, the coil winding 12 consists of two layers of a wave winding mat 20, wherein the wave winding mat 20 can in that case only have two regions with different wire spacings. In other embodiments, four or five layers are provided, with correspondingly more regions with different wire spacings being provided in that case.

A wave winding device 50 for producing the wave winding mat 20 and a wave winding method for winding such a wave winding mat 20 that can be carried out therewith are explained in more detail below with reference to the illustrations of FIGS. 5 to 17.

Figure 5:
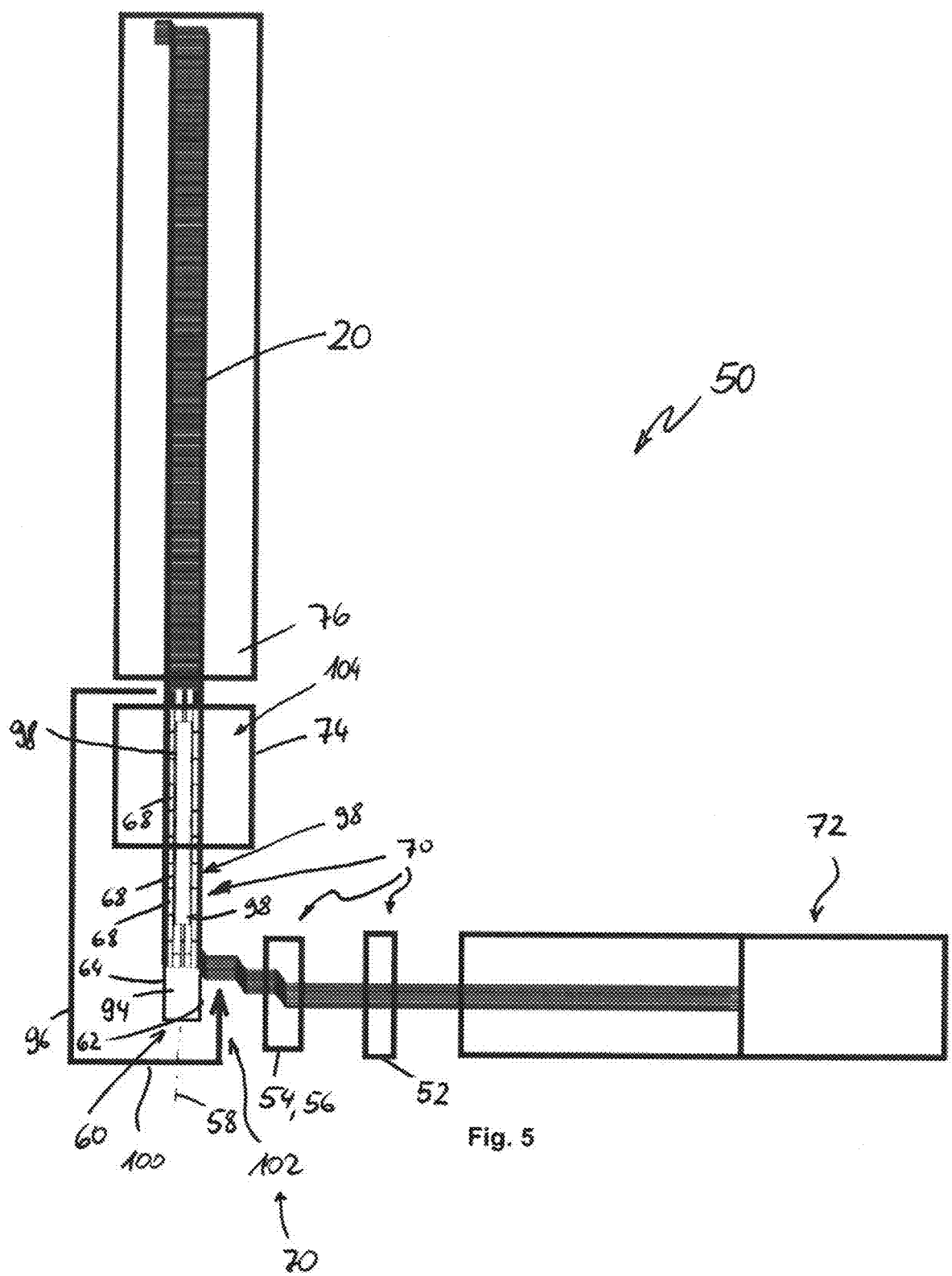
FIG. 5 shows a schematic overview of a wave winding device for producing the wave winding mat of FIGS. 3 and 4.

FIG. 5 shows an overview of the wave winding device 50. The wave winding device 50 serves for winding the wave winding mat 20, which is suitable for forming the coil winding 12 for the electrical machine. The wave winding device 50 has at least one holding device 52, 54, 56 and a winding apparatus 60, which is rotatable about an axis of rotation 58 and has at least one bending edge 62, 64.

At least one first jaw 66 for detachably holding the wires 24 on the holding device 52, 54, 56 is provided on the at least one holding device 52, 54, 56.

At least one second jaw 68 for detachably holding the wires 24 in the region of the bending edge 62, 64 is provided on the winding apparatus 60.

Further, a jaw exchanging assembly 70 for exchanging the at least one first jaw 66 and the at least one second jaw 68 is provided.

Preferably, the jaw exchanging assembly 70 has one or more jaw exchanging units 84 for exchanging first jaws 66, and one or more second jaw exchanging units for exchanging second jaws 68.

In the illustrated embodiment of the wave winding device 50, a wire providing device 72 for providing the bundle of wires 24 that are guided parallel to each other, and an end turn forming device 74 as well as an outputting unit 76 for transferring the wound wave winding mat 20 onto a workpiece carrier are provided.

The wire providing device 72 has bearings, which are not shown in more detail here, for wire drums from which the individual wires 24 can be reeled off and guided parallel to the at least one holding device 52.

Not just one holding device 52, but a plurality of holding devices 52, 54, 56 is provided in the illustrated wave winding device 50, by means of which the transporting steps and bending steps prior to bending back the end turns on the wires 24 can be carried out.

In the specific exemplary embodiment, a first holding device 52 configured for feeding the wire is provided. In particular, the first holding device 52 can be moved back and forth as a first machine axis in a feeding direction for the wire (towards the left and right in FIG. 5).

Further, a second holding device 54 is provided, which itself is configured to be fixed or stationary within the wave winding device 50. This second holding device 54 thus forms a second machine axis.

Further, a third holding device 56 is provided, which as a third machine axis can be moved back and forth in a direction transverse to the feeding direction—in the direction of the width of the wire bundle or of the axis of rotation 58—in order to bend an offset for the slanting wire sections 30. For this purpose, the third holding device 56 can be moved up and down relative to the second holding device 54 in FIG. 5.

All of the aforementioned holding devices 52, 54, 56 can be moved up and down together in order to follow the movement of the at least one bending edge 62, 64.

Figure 6:
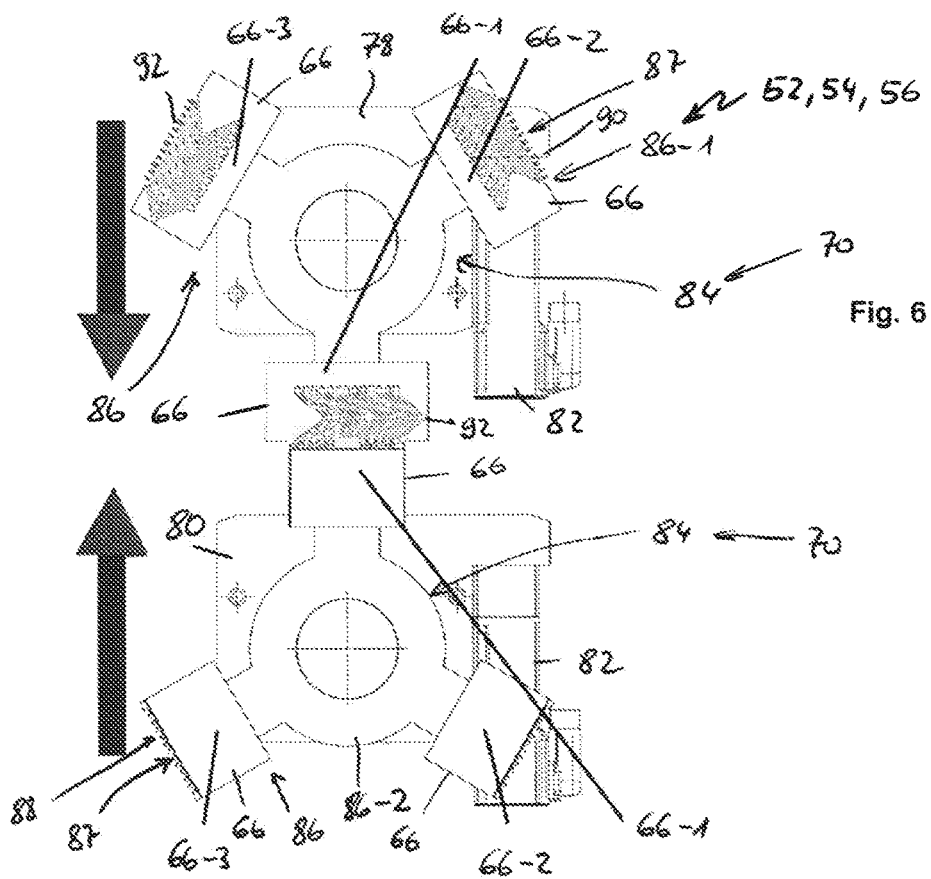
FIG. 6 shows a front view of a holding device of the wave winding device of FIG. 5.

Each of the holding devices 52, 54, 56 has a plurality of first jaws 66. In this case, each of the holding devices 52, 54 has pairs of associated first jaws 66 that can be relatively moved towards each other. FIGS. 6 and 7 show an exemplary configuration of each of the holding devices 52, 54, 56. For this purpose, a first jaw carrier 78 and a second jaw carrier 80 are provided, which can be moved towards each other on jaw carrier guides 82, as illustrated by arrows in FIG. 6, in order to clamp the wires 24 between a corresponding pair of first jaws 66, or can be moved away from each other in order to release the wires 24.

As shown in FIGS. 6 and 7, different first jaws 66-1, 66-2, 66-3 are respectively provided in pairs, which are configured for defining different wire spacings d1, d2, d3.

In total, a pair of first jaws 66-1 for the first wire spacing d1, a pair of first jaws 66-2 for the second wire spacing d2 and a pair first jaws 66-3 for the third wire spacing d3 are provided.

The jaw exchanging assembly 70 has a first jaw exchanging unit 84 for exchanging the respective pair of first jaws 66 on the respective holding device 52, 54, 56.

In the embodiment depicted in FIGS. 6 and 7, the jaw exchanging unit 84 for exchanging the first jaws 66 is configured as a rotary magazine 86. A first rotary magazine 86-1 with the one different first jaws 66-1, 66-2, 66-3 is provided on the first jaw carrier 78, and a second rotary magazine 86-2 with the corresponding counterparts of the first jaws 66-1, 66-2, 66-3 is provided on the second jaw carrier 80.

The jaws on the second jaw carrier 80 have on their clamping surface stationary accommodating grooves 88 as wire accommodating portions 87, whose spacing corresponds to the desired wire spacing d1, d2, d3. The jaws on the first jaw carrier 78 have on their clamping surface a flexible profile with flexible accommodating grooves 90 as wire accommodating portions 87, whose spacing also corresponds to the respective desired wire spacing d1, d2, d3, wherein the position of the accommodating grooves 90 is configured to be flexible, however. For example, this is realized by means of spring members 92 that are capable of yielding flexibly. A flexible clamping force can be applied to the wires 24 by means of the spring members 92.

If a different wire spacing d1, d2, d3 is to be provided at the transition from one of the regions 36, 40, 44 into another, then the respectively matching pair of first jaws 66-1, 66-2, 66-3 is provided by rotating the rotary magazines 86-1, 86-2. Thus, a jaw exchange system is created.

The first jaws 66 are disposed on a rotary module, for example, and are automatically exchanged depending on the wire spacing d1, d2, d3. In the exemplary embodiments shown, two rotary modules with three jaws each are provided. Thus, three different wire spacings can be wound. The contour of the first jaws 66-1, 66-2, 66-3 determines the wire spacing. Each wire 24 is reliably clamped with the jaw on the second jaw carrier 80 and the opposing jaw on the first jaw carrier 78 with the flexible profile.

As was already mentioned above, the second holding device 54 and the third holding device 56 are configured substantially identically to the first holding device 52. In this case, the jaw carrier guide 82 of the second holding device 54 may be provided so as to be stationary in the wave winding device 50 by being anchored to a holding device carrier (not shown) that can be moved only with respect to the height direction relative to a machine bed. The jaw carrier guide 82 of the first holding device 52 is disposed on a slide or the like, which can be moved back and forth in the wire feeding direction, is not shown in detail and which is supported in a traversable manner on the holding device carrier, for example. The jaw carrier guide 82 of the third holding device 56 can be moved transversely thereto, e.g. also being disposed on a slide or the like, which is not shown in detail and which also can be traversed on the holding device carrier.

As FIG. 5 shows, to which reference is again made, the winding apparatus 60 in the exemplary embodiment shown in detail here has a winding blade 94 that is rotatable about the axis of rotation 58. This is configured like a strip with conically tapering ends, so that a first bending edge 62 and an opposite second bending edge 64 are respectively formed at the narrow sides.

Furthermore, the winding apparatus 60 has a plurality of second jaws 68. The second jaws 68 are configured as circulating jaws. They can be guided on a circulating path 96 from the end of the winding apparatus 60 to its beginning. In the winding apparatus 60, jaw guides 98 are provided on which the circulating second jaws 68 are first guided towards the respective side of the winding blade 94 for capturing the wires 24, and are then guided along the winding blade 94 in the direction transverse to the feeding direction (upwards in FIG. 5), i.e., particularly in the direction of the axis of rotation 58.

The jaw guide 98 and the circulating path 96 form second jaw exchanging units of the jaw exchanging assembly 70. Several different second jaws 68 are provided, each of which comprises wire accommodating portions 87 with stationary accommodating grooves 88 as they were described above with respect to the first jaws 66-1, 66-2, 66-3 of the second jaw carrier 80. The different second jaws 68 have accommodating grooves 88, which are spaced apart from each other in accordance with the wire spacings d1, d2, d3 to be handled in each case, as wire accommodating portions 87.

The circulating path 96 forms a jaw returning device 100 for returning second jaws 68 from an end of the jaw guide 98 to a beginning of the jaw guide 98. The circulating path 96—for example by means of buffers not shown, or accommodating magazines for the second jaws 68—is configured in such a way that the matching second jaws with the correct spacings between the wire accommodating portions 87 are in each case supplied at the beginning of the jaw guide 98. Thus, a jaw feeding device 102 for feeding correspondingly matching second jaws 68 into the jaw guide 98 is also provided.

The second jaws 68 have a clamping surface on a block or body, by means of which they are suitable for being positively guided on the jaw guide 98 which, for example, is configured as a rail.

Figure 15:
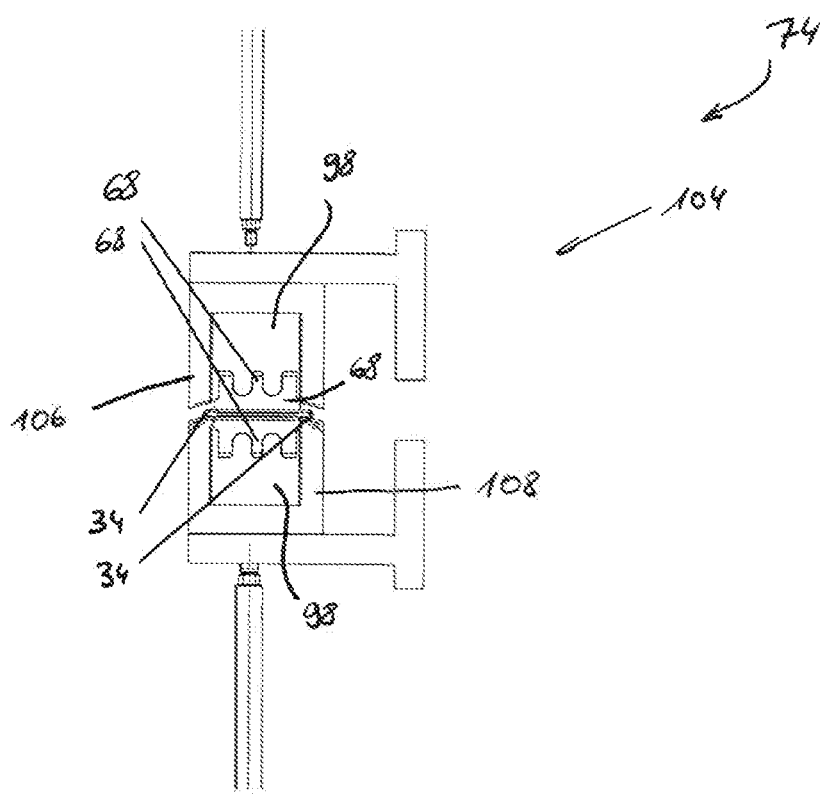
FIG. 15 shows a side view from below in FIG. 5 onto an end turn forming device of the wave winding device.
Figure 16:
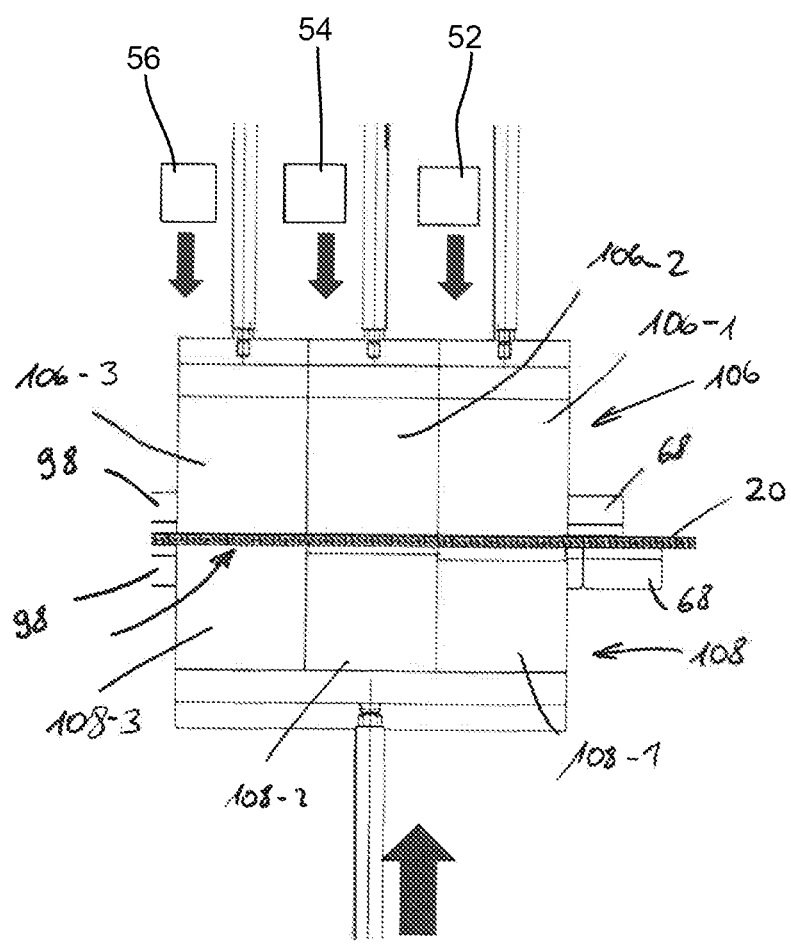
FIG. 16 shows the end turn forming device of FIG. 15 viewed from the right side in FIG. 15.

The jaw guide 98 extends in the direction of the axis of rotation 58 beyond the winding blade 94 into the end turn forming device 74, which is shown in more details in FIGS. 15 and 16.

The end turn forming device 74 has a forming unit 104 with one or more forming stamps 106 and a counter-holder 108. In the illustrated embodiment, a first forming stamp 106-1 for forming the end turns 34 on the first region 36, a second forming stamp 106-2 for forming the end turns 34 on the second region 40, and a third forming stamp 106-3 for forming the end turns 34 on the third region 44 are provided. The forming stamps 106-1, 106-2, 106-3 each have different forming geometries. During the forming of the end turns 34, the wave winding mat 20 is held in the circulating second jaws 68.

The wave winding method that can be carried out with the wave winding device 50 is explained in more detail below with reference to the illustrations of FIGS. 8 to 17.

In the illustration of FIG. 8, at the beginning of the production of a wave winding mat 20, the rotary modules on all holding devices 52, 54, 56 are first adjusted to the first jaws 66-1 for the first wire spacing d1. The jaw carriers 78, 80 of the second holding device 54 and of the third holding device 56 are moved towards each other, so that the wires 24 are clamped between the first jaws 66 of the second holding device 54 and the of third holding device 56, with the wires 24 being held in the wire accommodating portions 87 with the wire spacing d1. The jaw carriers 78, 80 of the first holding device 52 are moved away from each other. The first holding device 52 is moved in the direction of the wire providing device 72. The third holding device 56 is moved in the direction parallel to the axis of rotation 58.

Thus, the first jaws 66 of the second holding device 54 and the first jaws 66 of the third holding device 56 clamp the wire 24. The first jaws 66 of the first holding device 52 are open. The movement of the second holding device 54 and the third holding device 56 relative to each other generate the offset 110. Synchronously, the circulating second jaws 68 are pushed on the winding blade 94, with the respective second jaws 68 with the spacings of the wire accommodating portions 87 adjusted to the first wire spacing d1 being used also in this case. The circulating second jaws 68 are correspondingly pushed further in the jaw guides 98.

Figure 10:
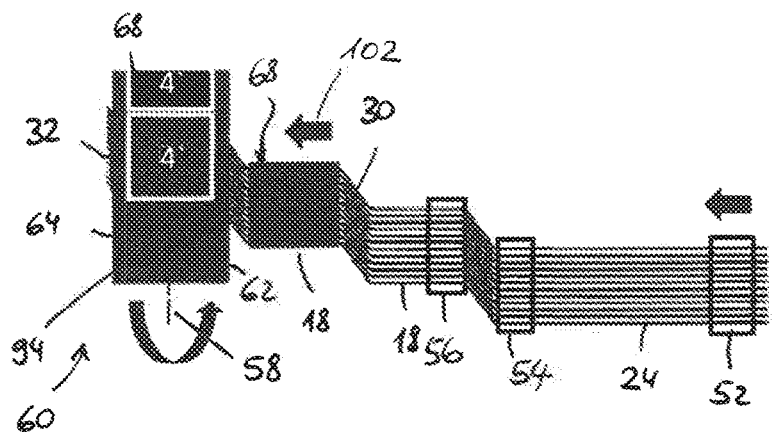
FIG. 10 shows a view as in FIG. 8 in a third process step.
Figure 11:
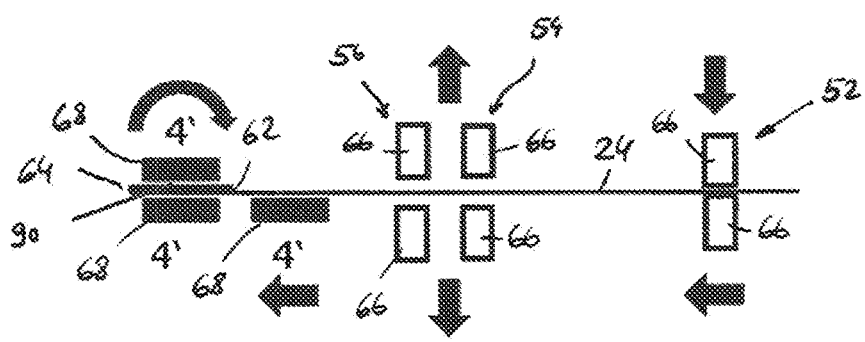
FIG. 11 shows a side view from below in FIG. 10.

This results in the situation as it is shown in FIG. 9. Starting from this situation, as is shown in FIGS. 10 and 11, the jaw carriers 78, 80 of the first holding device 52 are moved towards each other, so that the first jaws 66 of the first holding device 52 clamp the wires 24, while the jaw carriers 78, 80 of the second holding device 54 and the third holding device 56 are moved away from each other, so that they release the wires 24. At the same time, a new second jaw 68 is supplied by the jaw feeding device 102 in front of the winding blade 94. This second jaw 68 holds the wires 24 at the correct distance and serves as a counter support when bending the wire by rotating the winding blade 94. The winding blade 94 is now rotated. Synchronously with the traction by the winding blade 94 which is generated on the wire 24, the first holding device 52 is moved towards the winding blade 94. At the same time, the jaw feeding device 102 moves the newly provided second jaw 68 towards the winding blade 94. In the process, the newly provided second jaw 68 is moved from the position in front of the winding blade 94 to the position underneath the winding blade 94. This second jaw 68 guides the wires 24 in the process and serves as a counter-support during bending.

Figure 12:
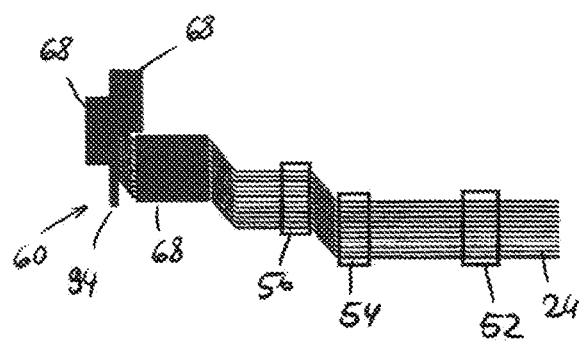
FIG. 12 shows a view comparable to that of FIG. 8 in yet another process step.
Figure 13:
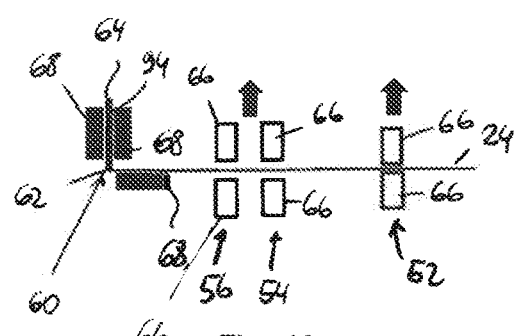
FIG. 13 shows a side view of the wave winding device in the process step of FIG. 12 shown from below in FIG. 12.

In a preferred embodiment, the axis of rotation 58 of the winding blade 94 is stationary. Therefore, the holding devices 52, 54, 56 are attached to a common holding device carrier, which can be moved up and down, is not shown in detail and which ensures that the supplied wires 24 follow the movement of the bending edges 62, 64. This is shown in FIGS. 12 and 13.

Figure 14:
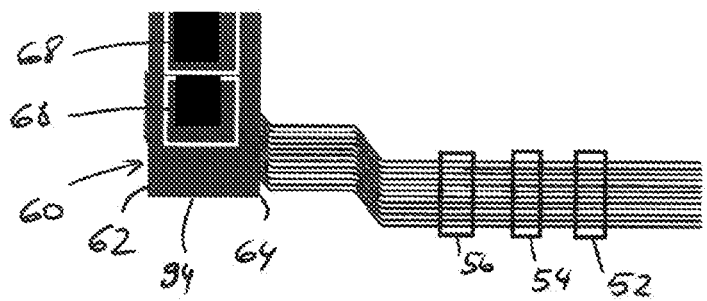
FIG. 14 shows a view comparable to that of FIG. 8, which shows the process step following the process step of FIG. 12 and thus constitutes an end of a winding cycle, followed in turn by a process step according to FIG. 8.

In FIG. 14, the wave winding device 50 is again located in the initial position as it is also shown in FIG. 8. With each half turn of the winding blade 94, a new circulating second jaw 68 is threaded onto the jaw guide 98. The correspondingly threaded second jaws 68 remain on the associated jaw guide 98 until after the forming unit 104 and are then taken up by the jaw returning device 100 and returned on the circulating path 96.

In this way, the windings of the first region 36 are wound at first. For the transition to the second region 40, the first jaws 66 on the holding devices 52, 54, 56 are then exchanged by the jaw exchanging assembly 70. Here, a replacement with the first jaw 66-2 for the second wire spacing d2 takes place by rotating the rotary magazines 86-1, 86-2. Accordingly, different second jaws 68 are then supplied by the jaw feeding device 102 and provided at the position in front of the winding blade 94. At the same time, the path of movement of the third holding device 56 is adjusted. The transition from the second region 40 to the third region 44 takes place in the same manner.

The corresponding regions of the wave winding mat 20 that are already wound are at first carried forward on the winding blade 94 in the direction of the axis of rotation 58 while being guided by the circulating second jaws 68, which are guided in the jaw guides 98, and are thus transferred into the forming unit 104 shown in FIGS. 15 and 16. Thus, the wave winding mat 20 is carried forward in the circulating second jaws 68 after bending on the winding blade 94. In the forming unit 104, the two jaws 68, which oppose each other correspondingly, are now pressed onto each other. Then, the end turn 34 is formed with the counter-holder 108 and the forming stamp(s) 106. The wires 24 are held at the defined wire spacing d1, d2, d3 by the second jaws 68, and the wire 24 is prevented from twisting during forming. When the end turn 34 is formed, it is pressed flat by the forming stamps 106. Depending on the position in the stator—in this respect, see FIG. 17—the end turn 34 may be formed slightly towards the outside or the inside by means of a different stamp geometry. Different forming stamps 106-1, 106-2, 106-3 according to FIG. 16 are provided for this purpose.

Thus, the wave winding mat 20 shown in FIG. 3 can be produced.

The wave winding mat 20 serves for being wound several times around the circumference of the stator 10. This results in different radii for the different layers 38, 42, 46. This used to result in problems during the insertion into the individual grooves. Therefore, the wave winding mat 20 is divided into three different portions—regions 36, 40, 44—each of which has a different wire spacing d1, d2, d3. The wave winding mat 20 itself has two wire layers 27, 28, each with bent-back portions on the side—end turns 34. The spacings between the wires are only very small; for example, they are in the lower millimeter range.

An exemplary configuration of the winding machine—wave winding device 50—is as follows:

First, there is a wire unreeling process. Then, wire feeding takes place. For this purpose, there is a device 52, which acts as a first machine axis and which is capable of moving in the wire feeding direction, taking along the wires 24 in the process by means of holding jaws.

Then, there is a further device 56, which acts as a second machine axis and which is capable of moving transversely thereto in order to bend an offset 110 of the wires 24 relative to one another. Following this device 56, the winding process takes place, e.g. about a winding blade 94 that is capable of rotating about an axis of rotation 58 transverse to the wire feeding direction in order to produce the windings. In the region of the winding blade 94, there is a track which extends transversely to the feeding axis and on which different second jaws 68 can be placed. These second jaws 68 are supplied with corresponding wire accommodating grooves. In the embodiment with different wire spacings, corresponding grooves with corresponding wire spacings are supplied. The adjoining wires 24 are captured therewith and bent back by rotating the winding apparatus 60. Due to the offset of the holding device 56 that causes the lateral displacement, the wire pack is then pushed to the side. Then, the next wire pack is bent back.

A forming unit 104, which serves for forming the end turns 34, is then provided at the end of the track. The end turns 34 are also formed by means of the second jaws 68. Thus, they determine the defined wire spacing.

The defined wire spacing results from holding the second jaws 68 during the bending-back process by means of the winding apparatus 60. Thus, the bending-back process results in the correct wire spacing in each case.

Each of the three holding devices 52, 54, 56 has a jaw exchanging unit 84 with which first jaws 66 with different wire spacing grooves can be used.

If the wire spacing is changed, the other jaw is then used accordingly; furthermore, the offset of the third holding device 56, which carries out the lateral bending process, is changed.

The forming unit 104 is a pressing unit which closes and presses the end turns 34 when the winding apparatus 60 stands still.

Thus, the wound wave winding mat 20 provided with formed end turns 34, which can then be fitted into the stator 10, comes out at the end of the forming unit 104.

The different units and devices of the wave winding device 50 may be electric motors, such as actuating motors, for example. Pneumatic and hydraulic drives are also possible.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

10 Stator
12 Coil winding
14 Holding body
16 Groove
18 Straight wire sections
20 Wave winding mat
24 Wires
26 First wire layer
28 Second wire layer
30 Slanting wire sections
32 Bent-back portion
34 End turn
36 First region
38 Outer layer
40 Second region
42 Middle layer
44 Third region
46 Inner layer
50 Wave winding device
52 First holding device
54 Second holding device
56 Third holding device
58 Axis of rotation
60 Winding apparatus
62 First bending edge
64 Second bending edge
66 First jaw
66-1 First jaw for first wire spacing
66-2 First jaw for second wire spacing
66-3 First jaw for third wire spacing
68 Second jaw
70 Jaw exchanging assembly
72 Wire providing device
74 End turn forming device
76 Outputting unit
78 First jaw carrier
80 Second jaw carrier
82 Jaw carrier guide
84 Jaw exchanging unit
86 Rotary magazine
86-1 First rotary magazine
86-2 Second rotary magazine
87 Wire accommodating portion
88 Stationary accommodating grooves
90 Flexible accommodating grooves
92 Spring members
94 Winding blade
96 Circulating path
98 Jaw guide
100 Jaw returning device
102 Jaw feeding device
104 Forming unit
106 Forming stamp
106-1 Forming stamp for end-turn form at first region
106-2 Forming stamp for end-turn form at second region
106-3 Forming stamp for end-turn form at third region
108 Counter-holder
110 Offset
d1, d2, d3 Wire spacing

The invention claimed is:

1. A wave winding method for winding a wave winding mat to form a coil winding of an electrical machine, the method comprising:
bending several wires of a wave winding mat to provide a predefined wire spacing between straight wire sections,
wherein the predefined wire spacing between the straight wire sections is different for different regions along a longitudinal direction of the wave winding mat,
wherein the wave winding mat comprises:
a first region with a first wire spacing $d1$ extending from a first end of the wave winding mat in the longitudinal direction towards a second end of the wave winding mat,
a third region with a third wire spacing $d3$ extending from the second end of the wave winding mat in the longitudinal direction towards the first end of the wave winding mat, and
a second region with a second wire spacing $d2$ provided between the first region and the third region, and wherein $d1 > d2 > d3$.

2. The wave winding method according to claim 1, further comprising:
exchanging at least one first jaw on a holding device for holding wires that are guided substantially parallel to each other with a different first jaw.

3. The wave winding method according to claim 1, further comprising:
exchanging at least one second jaw on a rotatable winding apparatus for forming a different wire spacing with a different second jaw.

4. The wave winding method according to claim 1, further comprising:
changing a spacing between the two straight wire sections connected to each other by an inclined wire section for forming a different wire spacing.

5. The wave winding method according to claim 1, further comprising:
transporting, by means of several jaws, an already wound region of the wave winding mat to be produced, by moving the jaws on a jaw guide extending in a direction of an axis of rotation of a winding apparatus.

6. The wave winding method according to claim 5, further comprising:
returning jaws from an end of the jaw guide to a beginning of the jaw guide.

7. A wave winding mat for forming a coil winding of an electrical machine, comprising:
substantially straight wire sections disposed at a predefined wire spacing from each other,
regions of the wave winding mat having a predefined wire spacing different from a predefined wire spacing of other regions,
wherein the regions comprise
a first region with a first wire spacing d1 extending from a first end of the wave winding mat in a longitudinal direction towards a second end of the wave winding mat,
a third region with a third wire spacing d3 extending from the second end of the wave winding mat in the longitudinal direction towards the first end of the wave winding mat, and,
a second region with a second wire spacing d2 provided between the first region and the third region, and
wherein d1>d2>d3.

* * * * *